(No Model.)  2 Sheets—Sheet 1.
J. F. SAITZ.
TROLLEY FOR ELECTRIC RAILWAYS.
No. 493,789. Patented Mar. 21, 1893.
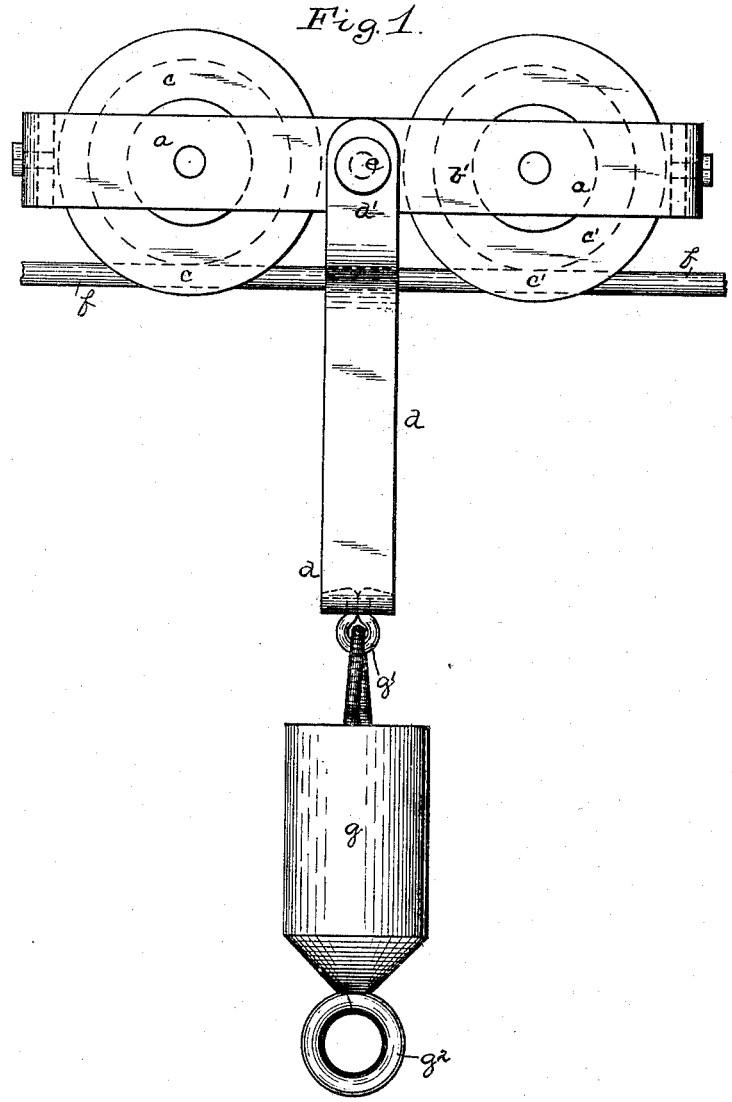
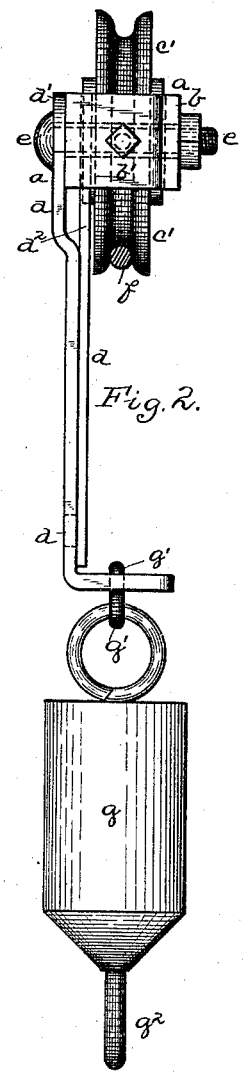
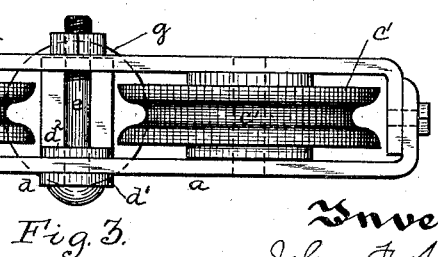

(No Model.) 2 Sheets—Sheet 2.
J. F. SAITZ.
TROLLEY FOR ELECTRIC RAILWAYS.
No. 493,789. Patented Mar. 21, 1893.
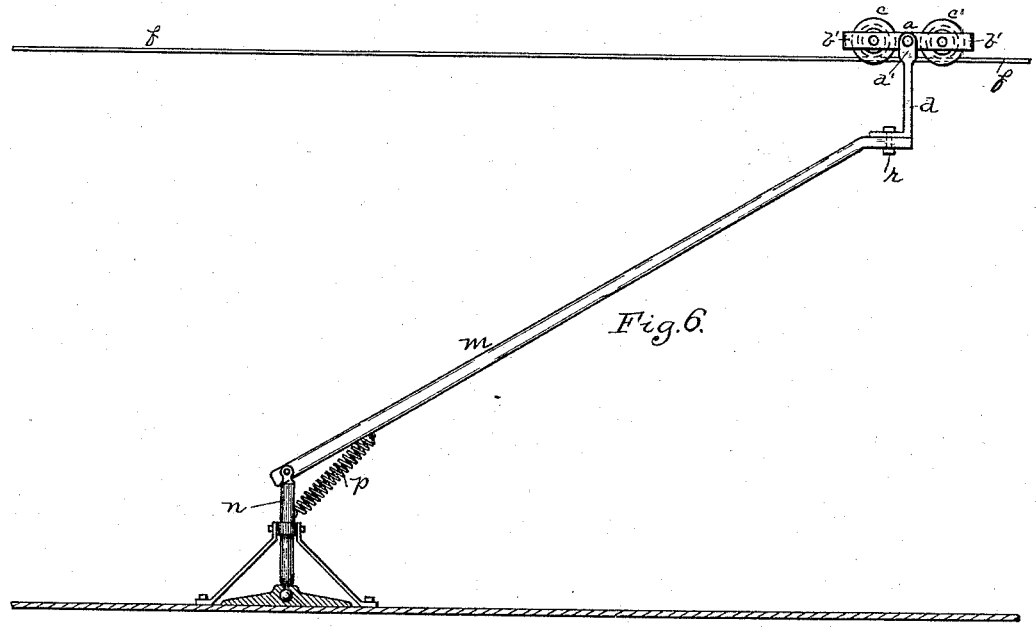
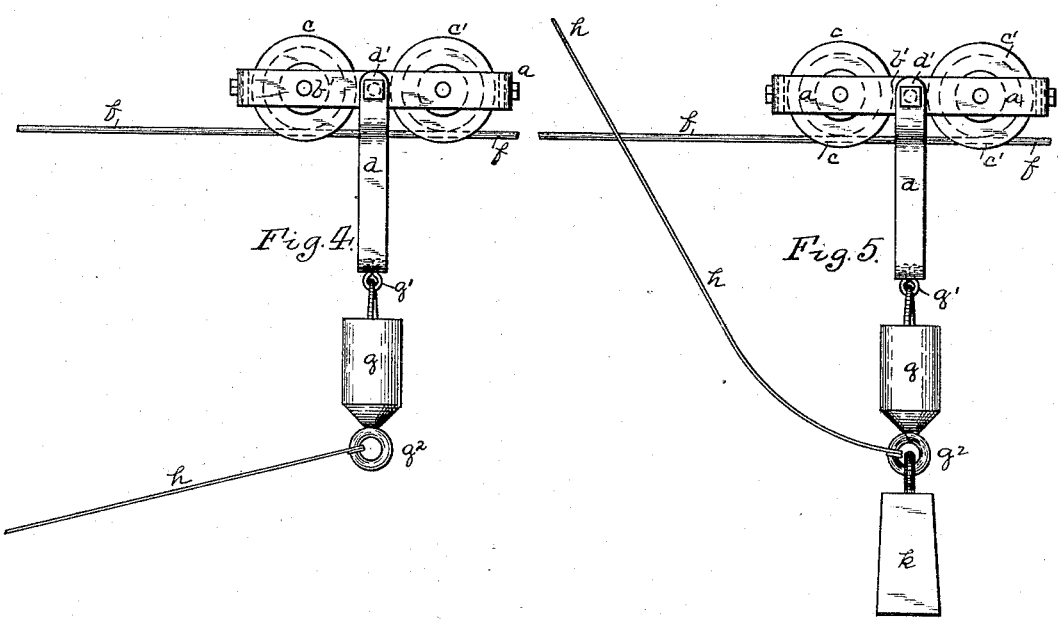
Witnesses:
J. N. Cooke
Robt. W. Patten
Inventor
John F. Saitz
By James J. Kay
Attorney

UNITED STATES PATENT OFFICE.

JOHN F. SAITZ, OF BALDWIN, ALLEGHENY COUNTY, ASSIGNOR OF TWO-THIRDS TO THOMAS A. NOBLE, OF PITTSBURG, AND FREDERICK G. KAY, OF ALLEGHENY, PENNSYLVANIA.

TROLLEY FOR ELECTRIC RAILWAYS.

SPECIFICATION forming part of Letters Patent No. 493,789, dated March 21, 1893.

Application filed June 18, 1891. Serial No. 396,680. (No model.)

*To all whom it may concern:*

Be it known that I, JOHN F. SAITZ, a resident of Baldwin township, in the county of Allegheny and State of Pennsylvania, have invented a new and useful Improvement in Trolleys for Electric Conveyances; and I do hereby declare the following to be a full, clear, and exact description thereof.

My invention relates to the trolleys employed for electric railways or other conveyances propelled by electric current; its object being to provide an efficient form of trolley, which can be drawn along the wire by a cable, pole or other connection, the invention being more especially applied to over-running trolleys, though some parts of it are applicable to the under-running trolleys, now more particularly used in connection with street car lines.

The special object of my invention might be briefly stated to be to provide a trolley which will hold the surface of the wire independently of the incline thereof and of the propelling rope or pole, and in which practically all fear of the trolley escaping from the wire is overcome.

To these ends my invention consists, generally stated, in the combination with the trolley frame of two trolley or grooved wheels mounted in said frame, a draft bar pivoted to the trolley frame between said wheels, and a weight hung loosely therefrom this draft bar providing for the drawing of the trolley along the wire, while the trolley frame is free to swing with relation to the draft bar and conform to the incline or course of the wire.

It also consists in certain other improvements as hereinafter described and claimed.

To enable others skilled in the art to make and use my invention, I will describe the same more fully, referring to the accompanying drawings, in which Figure 1 is a side view of apparatus embodying my invention. Fig. 2 is an end view of the same. Fig. 3 is a top view. Figs. 4 and 5 show the apparatus when drawn by a suitable cable; and Fig. 6 illustrates the same when drawn by a trolley pole.

Like letters of reference indicate like parts in each of the figures.

The trolley frame $a$ is made of metal, and, as illustrated in the drawings, is preferably made of two parts $b$ $b'$ connected at the ends by bolts, in which parts the trolley wheels $c$ $c'$ are mounted in suitable bearings. Pivoted to the frame between said trolley wheels, is the draft bar $d$, said bar in the construction shown having a bifurcated upper end, which will fit one arm $d'$ on the outside and the other arm $d^2$ on the inside of the strap $b'$ of the frame, and the bolt $e$ passing through the two straps of the frame and the two arms of the draft bar, and so providing for the pivoting of the draft bar to the frame; it being understood, of course, that said draft bar is pivoted to one side thereof in such position that the trolley wheels may run upon the wire $f$, and may be suitably supported by brackets extending out from poles or cranes. The trolley wheels $c$ $c$ are properly grooved so as to run upon the wire.

Where my improved trolley is to be drawn by the ordinary electric cable, I employ the construction illustrated in Figs. 1 to 5, and in order to hold the trolley upon the conducting wire, I prefer to suspend from the draft bar, the weight $g$, this weight being hung by a loose ring $g'$ so as to swing at the lower end of the draft bar and having a link $g^2$ at the base thereof, with which the electric wire or cable $h$ engages. The function of the weight is to hold the trolley frame and its trolley wheels in proper line, and so act to hold the draft bar in a vertical position, the pull of the cable or wire coming upon the weight which will swing in the link at the base of the draft bar, so permitting the draft bar to remain in a substantially vertical position, while the weight acting through the draft bar will hold the trolley in proper engagement with the wire, the weight being applied in the center of the trolley frame so as to act evenly on each of the trolley wheels, and on account of the draft bar being pivoted to the center of the frame, the frame being free to swing at any incline which the wire may assume, its position upon the wire not being affected by any pull upon the draft bar.

In employing such a trolley in an over-running contact, in connecting with a street car or like vehicle traveling on the ground, the cable is simply connected to the lower end of the weight $g$ as illustrated in Fig. 4. Where, however, the trolley is to be employed with an aerial or like vessel, in order to overcome the upward strain of the cable upon the trolley, I suspend from the weight $g$, a second weight $k$ and connect the cable to the link $g^2$ between said weights, the action of the second weight being such as will overcome the upward draft on the cable caused by the pulling of the trolley by a vehicle above the same. In such case, the two weights insure the holding of the trolley upon the wire and prevent its being lifted therefrom by the cable, which extends above the same. The lower weight $k$ may be changed according to the strain exerted upon the trolley by the cable so as to also insure the holding of the trolley to the wires.

In Fig. 6 I have illustrated the apparatus as applied to an over-running trolley connected by a pole to the top of the street car. The particular construction of the pole illustrated and the manner of mounting the same upon the car, forms the subject matter of a separate application of even date herewith, Serial No. 396,679 and requires no further description than the simple statement that the trolley pole $m$ is pivoted at the upper end of a vertically mounted trolley support $n$, the spring $p$ between said trolley support and trolley pole, causing a downward pressure of the upper end of the pole so as to hold the trolley upon the wire. The bar draft $d$ is connected to the upper end of the pole by a vertical pivot or bolt $r$ which permits the trolley to swing laterally at the upper end of the pole, so that the pole may be caused to conform to the course of the wire, even though it may not be above the car. The action in this case is practically the same as that in the other figures, the bar being pivoted between the trolley wheels and the power exerted by it acting evenly on both wheels. The construction in an under-running trolley would be practically the same, except that the pressure would be exerted in an upward direction, the spring connection with the pole being substantially such as that described in the application of even date herewith above referred to.

The trolley is of simple construction and has been practically and successfully tested, proving that by such mounting of the trolley frame with relation to the draft bar, the trolley is enabled to travel upon the wire no matter what the incline of the wire may be, nor the force exerted by the draft connection.

What I claim as my invention, and desire to secure by Letters Patent, is—

1. In trolleys for electric cars or like conveyances the combination of a trolley frame, two grooved wheels mounted therein, a draft bar connected to the trolley frame between said wheels and a weight hung loosely from said draft bar to balance the trolley frame, substantially as and for the purposes set forth.

2. In trolleys for electric cars or like conveyances, the combination of a trolley frame, two grooved wheels mounted therein, a draft bar pivoted to the trolley frame between said wheels, a weight hung from said draft bar, a second weight hung to the first weight, and a draft cable or like device connected to the trolley between said weights, substantially as and for the purposes set forth.

In testimony whereof I, the said JOHN F. SAITZ, have hereunto set my hand.

JOHN F. SAITZ.

Witnesses:
 JAMES I. KAY,
 J. N. COOKE.